United States Patent [19]

Emmons et al.

[11] Patent Number: 4,762,626

[45] Date of Patent: Aug. 9, 1988

[54] HYDROXYETHYLACRYLATE/ACRYLATE COPOLYMERS AS ZINC SULFIDE SCALE INHIBITORS

[75] Inventors: Daniel Emmons, Rosenberg; Gary R. Chesnut, Houston, both of Tex.

[73] Assignee: Nalco Chemical Company, Naperville, Ill.

[21] Appl. No.: 34,307

[22] Filed: Apr. 3, 1987

[51] Int. Cl.$^4$ ............................................. E21B 37/00
[52] U.S. Cl. .................................. 252/8.552; 166/279; 166/310; 252/8.554; 252/180
[58] Field of Search .................. 252/8.552, 8.554, 180; 166/279, 310

[56] References Cited

U.S. PATENT DOCUMENTS 3,880,765  4/1975  Watson ............................. 252/8.554
4,314,044  2/1982  Hughes et al. .................. 524/829 X Primary Examiner—Herbert B. Guynn
Attorney, Agent, or Firm—John G. Premo; Anthony L. Cupoli; Donald G. Epple

[57] ABSTRACT

The utilization of hydroxyethylacrylate/acrylic acid copolymer as a zinc sulfide scale inhibitor in oil well production processes.

3 Claims, No Drawings

HYDROXYETHYLACRYLATE/ACRYLATE COPOLYMERS AS ZINC SULFIDE SCALE INHIBITORS

FIELD OF THE INVENTION

The invention relates to inhibition of zinc sulfide scale in oil well production.

The term "percent" is defined to be weight percent.

The term "molecular weight" is defined to be weight average molecular weight.

The term "acrylate" includes the term "acrylic acid".

BACKGROUND OF THE INVENTION

Oil is pumped from the ground utilizing a number of different techniques. Included among these is the utilization of sucker rods for lifting oil to the surface; and electrically powered submersible pumps placed down hole for pumping oil to the surface. To facilitate pumping of oil to the surface, flush water is introduced to the oil well. This flush water is then pumped or sucked to the surface as produced water. The produced water includes the desired oil.

The down hole environment is particularly inhospitable to oil production equipment. The equipment utilized is typically subject to corrosion and scale formation. Sometimes, the scale formation can be crippling to the equipment requiring frequent cleaning and replacement. Typically, scale such as formed by Barium sulfate, and calcium sulfate, or calcium carbonate is encountered. Corrosion is also a problem.

Compositions have been prepared which are useful in controlling such scale. One such composition is disclosed in U.S. Pat. No. 3,880,765 issued to Watson. Watson teaches that low molecular weight ethoxylated acrylic polymers are particularly good Calcium (sulfate or carbonate) and Barium sulfate scale inhibitors and tend to remain in solution in the presence of large quantities of calcium salts.

We have found that certan hydroxyethylacrylate/acrylate copolymers are useful in controlling calcium scale.

However, we have recently encountered wells in which zinc sulfide scale formation is a problem. To the best of our knowledge, no art exists discussing the control of such scale. It would be advantageous to reduce or eliminate such scale to facilitate oil recovery.

SUMMARY OF THE INVENTION

We have discovered that hydroxyethylacrylate/acrylate copolymers can be introduced into a producing well to control zinc sulfide scale.

DISCUSSION

Hydroxyethylacrylate/acrylate copolymers which are particularly suited to preventing zinc sulfide scale have a weight average molecular weight within the range of from 1,000 to 20,000; and preferably, within the range of from 2,000 to 6,000.

Generally, the well will be treated with from 2-100 ppm copolymer on an actives basis. Preferably, with from 2-11 ppm of copolymer on an actives basis; and most preferably, with from 4-6 ppm copolymer on an actives basis. More than 100 ppm copolymer may be usable but, generally, will not be economical. Less than 2 ppm polymer will work, but better, more consistent and more predictable results will be obtained when at least 2 ppm polymer is used.

Any hydroxyethylacrylate/acrylate copolymer having the above characteristics will work. Generally, the greater the hydroxyethylacrylate percentage of the copolymer, the more likely the copolymer will remain in solution under down hole conditions.

Preparation of Hydroxyethylacrylate/Acrylate Copolymer=Composition A

Acrylic acid (8.53%), hydroxyethylacrylate (2.84%) and water (31%) were charged to a reaction vessel placed under a nitrogen atmosphere. Thioglycolic acid (1.8%) and 35% aqueous hydrogen peroxide (1.8%) were charged with mixing to the same vessel with flushing between charges. At the completion of the exotherm. Sodium hydroxide (6.4%) aqueous was added with the stirring while maintaining a temperature below 70° C. Seven percent water is added and the material mixed further to produce Composition A.

EXAMPLES

Oil Well A

Well A was diagnosed as having a zinc sulfide scale problem. The scaling was so severe that pumps had to be repaired or replaced every 21 days. These were short pump runs.

Composition A was fed to the flush water continuously for 8 hours a day. The remaining 16 hours of the day, no polymer was utilized. Under these conditions, starting with the first use of copolymer, a 10 week pump run was achieved. After the pumps were pulled and restored, a second run of 8 weeks was achieved.

After these two semi-batch tests were conducted, Composition A was fed continously on a 24 hour per day basis. The pumps have been running for over 6 months without failure since continous feed commenced. The feed of the copolymer has been within the range of 4–10 ppm on an actives basis.

The produced water was monitored both prior to the utilization of Composition A and monitored again after Composition A had been fed continuously for a period of time. The zinc levels in the produced water more than doubled once continous feed of Composition A commenced.

Oil Well B

Hydroxyethylacrylate/acrylate copolymer was fed at another well having a zinc sulfide problem. Since the introduction of the copolymer (weight average molecular 3500) the well has run in excess of 4 months without any need to pull the pumps.

Having thus described our invention, we claim:

1. A method for inhibiting zinc sulfide scale in oil well operations, comprising introducing hydroxyethylacrylate/acrylate copolymer to oil flush water, said copolymer having a weight average molecular weight within the range of from 1,000 to 20,000.

2. The method of claim 1 wherein said polymer is dosed at 2-100 ppm on an actives basis.

3. The method of claim 2 wherein said polymer has a molecular weight within the range of 2,000–6,000 and is dosed at 2–10 ppm on an actives basis.

* * * * *